(12) United States Patent
Nishimura (10) Patent No.: US 11,790,624 B2
(45) Date of Patent: Oct. 17, 2023

(54) VIDEO PROCESSING METHOD, VIDEO PROCESSING APPARATUS, AND RECORDING MEDIUM HAVING VIDEO PROCESSING PROGRAM RECORDED THEREIN

(71) Applicant: MAZDA MOTOR CORPORATION, Hiroshima (JP)

(72) Inventor: Tatsunori Nishimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 84 days.

(21) Appl. No.: 17/616,150

(22) PCT Filed: Jun. 1, 2020

(86) PCT No.: PCT/JP2020/021600
§ 371 (c)(1),
(2) Date: Dec. 2, 2021

(87) PCT Pub. No.: WO2020/246425
PCT Pub. Date: Dec. 10, 2020

(65) Prior Publication Data
US 2022/0254129 A1 Aug. 11, 2022

(30) Foreign Application Priority Data

Jun. 7, 2019 (JP) ................................ 2019-106966

(51) Int. Cl.
*G06T 19/20* (2011.01)
(52) U.S. Cl.
CPC ...... *G06T 19/20* (2013.01); *G06T 2219/2012* (2013.01)

(58) Field of Classification Search
CPC ................. G06T 19/20; G06T 2219/2012
(Continued)

(56) References Cited

U.S. PATENT DOCUMENTS 9,710,968 B2 * 7/2017 Dillavou ............... G06T 19/006
10,977,868 B2 * 4/2021 Neeter .................. G06T 19/006
(Continued)

FOREIGN PATENT DOCUMENTS

JP 2017-067876 A 4/2017
JP 2017-107349 A 6/2017
(Continued)

OTHER PUBLICATIONS

International Search Report issued in PCT/JP2020/021600; dated Jun. 30, 2020.

*Primary Examiner* — Thomas J Lett
(74) *Attorney, Agent, or Firm* — Studebaker & Brackett PC (57) ABSTRACT

A method is provided for processing a video to be displayed on a head mounted display device mounted on a worker performing virtual work. A position, posture, and line of sight of the worker are acquired, and a three-dimensional model of a work object on which the worker performs virtual work and a three-dimensional model of the worker are displayed on a display screen according to the acquired position, posture, and line of sight. A distance visualization portion is displayed which linearly extends from a predetermined section of the three-dimensional model of the worker and connects the predetermined section and the three-dimensional model of the work object, to visualize a distance between the predetermined section and the work object.

17 Claims, 8 Drawing Sheets

(58) Field of Classification Search
USPC .......................................................... 345/419
See application file for complete search history.

(56) References Cited

U.S. PATENT DOCUMENTS

| | | |
|---|---|---|
| 11,288,871 B2* | 3/2022 | Kim ..................... G06T 19/20 |
| 2012/0113223 A1 | 5/2012 | Hilliges et al. |
| 2014/0176533 A1* | 6/2014 | Dillavou ............... G06T 19/006 |
| | | 345/419 |
| 2016/0019212 A1* | 1/2016 | Soldani ................. G06T 19/006 |
| | | 345/633 |
| 2017/0061631 A1 | 3/2017 | Karasudani et al. |
| 2017/0092004 A1 | 3/2017 | Nishizawa et al. |
| 2017/0308673 A1* | 10/2017 | Dillavou ................ G16H 50/50 |
| 2018/0204478 A1* | 7/2018 | Banga .................... G09B 9/042 |
| 2023/0106673 A1* | 4/2023 | Asghar ................. G06V 20/597 |
| | | 382/104 |

FOREIGN PATENT DOCUMENTS

| | | |
|---|---|---|
| JP | 2018-181288 A | 11/2018 |
| JP | 2019-033881 A | 3/2019 |

* cited by examiner

VIDEO PROCESSING METHOD, VIDEO PROCESSING APPARATUS, AND RECORDING MEDIUM HAVING VIDEO PROCESSING PROGRAM RECORDED THEREIN

TECHNICAL FIELD

The present disclosure relates to a video processing method, a video processing apparatus, and a recording medium having a video processing program recorded therein, for processing a video to be displayed on a display screen of a head mounted display device mounted on a worker.

BACKGROUND ART

In a production line such as a vehicle assembly line, workers change their postures, lines of sight, and the like according to a wide variety of work such as assembly work and fastening work, and the work of each worker in such a production line is evaluated to reduce the workload on the worker.

In recent years, instead of evaluating work of the worker through actual work of the worker in such a production line, use of mixed reality (MR) has been considered, in which a head mounted display device is mounted on the worker, and a three-dimensional model of the production line and a three-dimensional model of the worker are displayed on a display screen of the head mounted display device according to a posture, line of sight, and the like of the worker. so that the work of the worker in the production line is simulated by moving the three-dimensional model of the worker in line with a motion of the worker to evaluate the work of the worker.

For example, Japanese Patent Laid-Open No. 2018-181288 discloses a technique of displaying virtual work in which three-dimensional data to be measured and three-dimensional data of the worker based on a motion of the worker acquired from a motion capture device are read into a computer, both data are disposed on common three-dimensional coordinates, and the three-dimensional data to be measured which can be viewed via a virtual camera virtually disposed on the common three-dimensional coordinates and the three-dimensional data of the worker in conjunction with the motion of the worker acquired from the motion capture device are displayed on a screen.

SUMMARY

As described above, by means of the mixed reality, the work of the worker in the production line is simulated by processing a video for displaying the three-dimensional model of the production line and the three-dimensional model of the worker on the display screen of the head mounted display device mounted on the worker, according to a posture, line of sight, and the like of the worker, so that it is possible to evaluate the work of the worker in the production line without actual work of the worker in the production line.

However, in the case of simulating work of the worker in a production line such as a vehicle assembly line, for example, when manual work is simulated by moving a hand portion of the three-dimensional model of the worker with respect to a work object of the three-dimensional model of the production line displayed on the display screen of the head mounted display device, the worker might not precisely recognize a sense of distance between a predetermined section such as the hand portion of the worker and the work object which are displayed on the display screen of the head mounted display device.

Thus, an advantage of the present disclosure is, in processing of a video to be displayed on a display screen of a head mounted display device mounted on a worker, to allow the worker to intuitively recognize a distance between a predetermined section of the worker and a work object which are displayed on the display screen.

To solve the above problem, the present disclosure is characterized by the following configurations.

A first aspect of the present disclosure is a video processing method for processing a video to be displayed on a display screen of a head mounted display device mounted on a head portion of a worker, the video processing method including a step (a) of acquiring a position and posture of the worker, a step (b) of acquiring a line of sight of the worker, and a step (c) of displaying on the display screen a three-dimensional model of a work object on which the worker performs virtual work and a three-dimensional model of the worker according to the position and posture of the worker acquired by the step (a) and the line of sight of the worker acquired by the step (b), wherein, in the step (c), a distance visualization portion is displayed on the display screen which linearly extends from a predetermined section of the three-dimensional model of the worker and connects the predetermined section and the three-dimensional model of the work object to visualize a distance between the predetermined section and the work object.

According to the first aspect, in the processing of the video to be displayed on the display screen of the head mounted display device mounted on the worker, the position, posture, and line of sight of the worker are acquired, and the three-dimensional model of the work object on which the worker performs virtual work and the three-dimensional model of the worker are displayed on the display screen according to the position, posture, and line of sight of the worker. Then, the distance visualization portion linearly extending from the predetermined section of the three-dimensional model of the worker and connecting the predetermined section and the three-dimensional model of the work object is displayed on the display screen.

Thus, the distance visualization portion linearly extending from the predetermined section of the three-dimensional model of the worker can be displayed so as to be shorter as the distance between the predetermined section of the worker and the work object becomes shorter, and can be displayed with a length according to the distance between the predetermined section of the worker and the work object. Accordingly, in the processing of the video to be displayed on the display screen of the head mounted display device mounted on the worker, it is possible to allow the worker to intuitively recognize the distance between the predetermined section of the worker and the work object which are displayed on the display screen, by the length of the distance visualization portion.

Since it is possible to allow the worker to intuitively recognize the distance between the predetermined section of the worker and the work object, for example, when work of the worker in a production line such as a vehicle assembly line is simulated to evaluate the work load on the worker, it is possible to simulate the same work as in the case where the worker performs work with respect to the actual work object, and it is possible to evaluate the work load on the worker with high accuracy.

In the above aspect, the distance visualization portion may linearly extend from a hand portion of the three-dimensional model of the worker.

Thus, the distance visualization portion linearly extending from the hand portion of the three-dimensional model of the worker is displayed, so that, in the case of simulating manual work of the worker with respect to the work object, it is possible to allow the worker to intuitively recognize the distance between the hand portion of the worker and the work object which are displayed on the display screen.

Furthermore, in the above aspect, the distance visualization portion may extend in a linear and bar shape.

Thus, it is possible to allow the worker to intuitively recognize the distance between the predetermined section of the worker and the work object by the distance visualization portion with relative ease.

Furthermore, in the above aspect, in the step (c), a display mode of the distance visualization portion may be changed according to the distance between the predetermined section and the work object.

Thus, it is also possible to allow the worker to recognize the distance between the predetermined section of the worker and the work object by the display mode of the distance visualization portion without changing the display region of the distance visualization portion.

Furthermore, in the step (c), the display mode of the distance visualization portion may be to change a display color.

Thus, it is possible to change the display mode of the distance visualization portion with relative ease.

Furthermore, a second aspect of the present disclosure is a video processing apparatus for processing a video to be displayed on a display screen of a head mounted display device mounted on a head portion of a worker, and the apparatus includes a processor, and a memory that stores a computer program executable by the processor, the computer program, when executed by the processor, executing a step (a) of acquiring a position and posture of the worker, a step (b) of acquiring a line of sight of the worker, and a step (c) of displaying on the display screen a three-dimensional model of a work object on which the worker performs virtual work and a three-dimensional model of the worker according to the position and posture of the worker acquired by the step (a) and the line of sight of the worker acquired by the step (b), wherein in the step (c), a distance visualization portion is displayed on the display screen, the distance visualization portion linearly extending from a predetermined section of the three-dimensional model of the worker and connecting the predetermined section and the three-dimensional model of the work object to visualize a distance between the predetermined section and the work object.

The same operations and effects as in the first aspect can be provided by the second aspect.

Furthermore, a third aspect of the present disclosure is a computer-readable recording medium having a video processing program recorded therein for processing a video to be displayed on a display screen of a head mounted display device mounted on a head portion of a worker, the video processing program, when executed by the computer, executing a step (a) of acquiring a position and posture of the worker, a step (b) of acquiring a line of sight of the worker, and a step (c) of displaying on the display screen a three-dimensional model of a work object on which the worker performs virtual work and a three-dimensional model of the worker according to the position and posture of the worker acquired by the step (a) and the line of sight of the worker acquired by the step (b), wherein in the step (c), a distance visualization portion is displayed on the display screen, the distance visualization portion linearly extending from a predetermined section of the three-dimensional model of the worker and connecting the predetermined section and the three-dimensional model of the work object to visualize a distance between the predetermined section and the work object.

The same operations and effects as in the first aspect can be provided by executing the video processing program recorded in the recording medium of the third aspect.

According to the present disclosure in the processing of the video to be displayed on the display screen of the head mounted display device mounted on the worker, it is possible to allow the worker to intuitively recognize the distance between the predetermined section of the worker and the work object which are displayed on the display screen, by the length of the distance visualization portion.

DETAILED DESCRIPTION

Hereinafter, embodiments of the present disclosure will be described with reference to the attached drawings.

Figure 1:
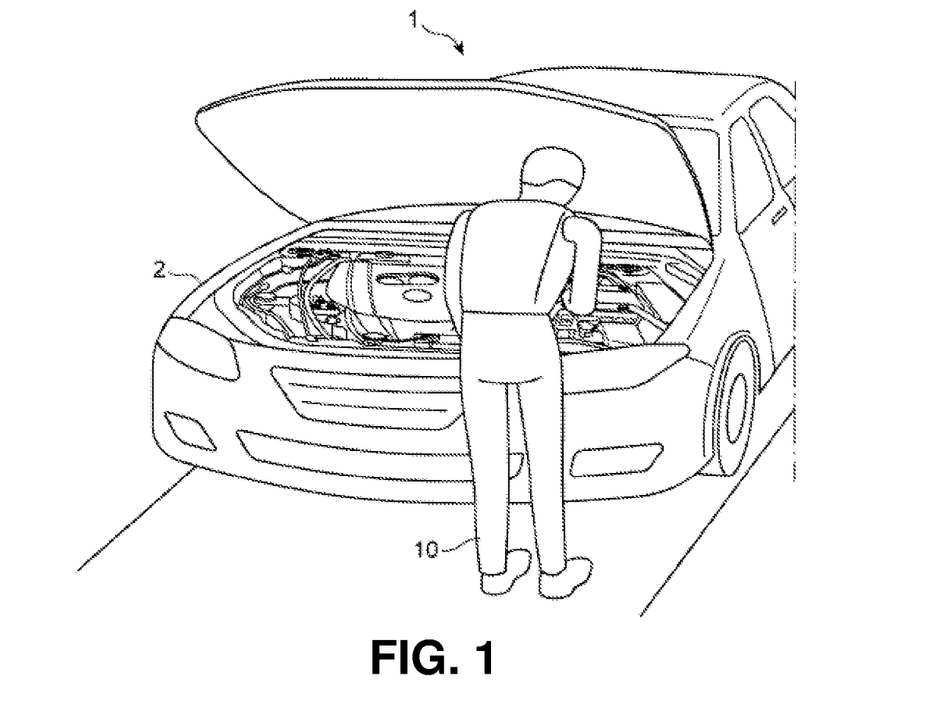
FIG. 1 is an explanatory view for describing work of a worker in a production line which is evaluated by using a video processing apparatus according to a first embodiment of the present disclosure.

FIG. 1 is an explanatory view for describing work of a worker in a production line which is evaluated by using a video processing apparatus according to a first embodiment of the present disclosure. The video processing apparatus according to the first embodiment of the present disclosure is used when a three-dimensional model of the production line on which the worker performs virtual work and a three-dimensional model of the worker are displayed on a display screen of a head mounted display device mounted on the worker, according to a position, posture, and line of sight of the worker, and the work of the worker in the production line is simulated by moving the three-dimensional model of the worker in line with a motion of the worker to evaluate the work of the worker in the production line.

As illustrated in FIG. 1, for example, regarding the case where a worker 10 performs work such as assembly work or fastening work with respect to a vehicle 2 as a work object in a vehicle assembly line 1 as a production line, the video processing apparatus according to the first embodiment of the present disclosure is used when the work of the worker 10 in the production line 1 is simulated to evaluate the work of the worker in the production line.

Figure 2:
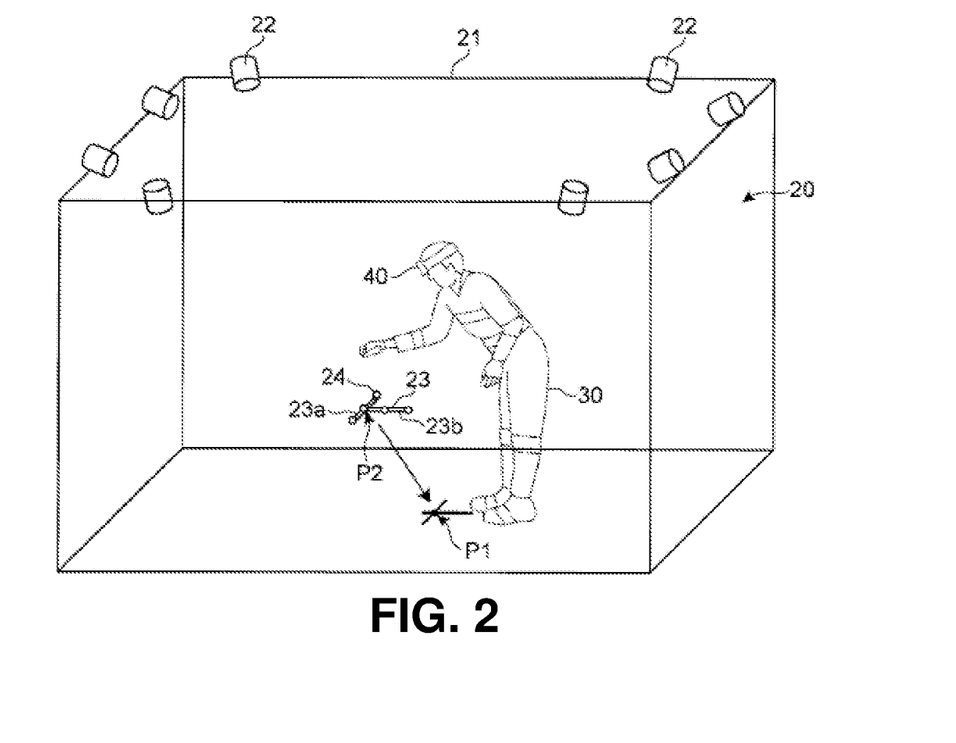
FIG. 2 is an explanatory view for describing a method for acquiring a position, posture, and line of sight of the worker.

FIG. 2 is an explanatory view for describing a method for acquiring a position, posture, and line of sight of the worker. As illustrated in FIG. 2, in the case of evaluating the work of the worker in the production line using the video processing apparatus, a plurality of cameras 22, specifically, eight cameras 22 are fixed to a frame 21 provided in a real three-dimensional space 20 in which the worker performs virtual work. The cameras 22 are fixed such that positions and directions of the cameras 22 are set in advance to respective predetermined positions and respective predetermined directions.

In the real three-dimensional space 20, first, an origin setting implement 23 formed in a T shape is disposed at a predetermined origin position P1. The origin setting implement 23 has markers 24 attached to both end portions of an arm portion 23a, both end portions of a leg portion 23b, and a center portion of the leg portion 23b. The origin setting implement 23 is disposed in such a superimposed manner that an intersection P2 of the arm portion 23a with the leg portion 23b coincides with the origin position P1. For the markers 24, known markers such as spherical reflective markers are used.

Then, images of the origin setting implement 23 are captured by the plurality of cameras 22, positions of the markers 24 of the origin setting implement 23 are acquired based on the images captured by the plurality of cameras 22, and the origin position P1 and an XYZ coordinate system are acquired from the positions of the markers 24 of the origin setting implement 23. For example, an XYZ coordinate system is acquired in which the leg portion 23b of the origin setting implement 23 serves as an X axis, the arm portion 23a serves as a Y axis, and a normal line of a surface passing through the leg portion 23b and the arm portion 23a serves as a Z axis. Once the origin position P1 and the XYZ coordinate system are acquired in the real three-dimensional space 20, the origin setting implement 23 is removed.

Next, on a display screen of a head mounted display device 40 mounted on a head portion of a worker 30 in the real three-dimensional space 20, a three-dimensional model of the work object in the production line on which the worker performs virtual work is displayed in a virtual three-dimensional space, and an origin position and an XYZ coordinate system in the virtual three-dimensional space are made to coincide with the origin position P1 and the XYZ coordinate system in the real three-dimensional space 20 and aligned therewith.

The origin position and the XYZ coordinate system in the virtual three-dimensional space are aligned with the origin position P1 and the XYZ coordinate system in the real three-dimensional space 20, thereby allowing the worker 30 with the head mounted display device 40 mounted thereon to virtually visually recognize the three-dimensional model of the vehicle as the work object in the vehicle assembly line as the production line which is displayed in the virtual three-dimensional space, at the same position as in the real three-dimensional space.

To acquire a position, posture, and line of sight of the worker 30, a plurality of markers are attached to the worker 30 on which the head mounted display device 40 is mounted. Markers for acquiring a position and posture of the worker 30 are attached to the worker 30, and a marker for acquiring a line of sight of the worker is attached to the head mounted display device 40 provided at the head portion of the worker 30.

Figure 3:
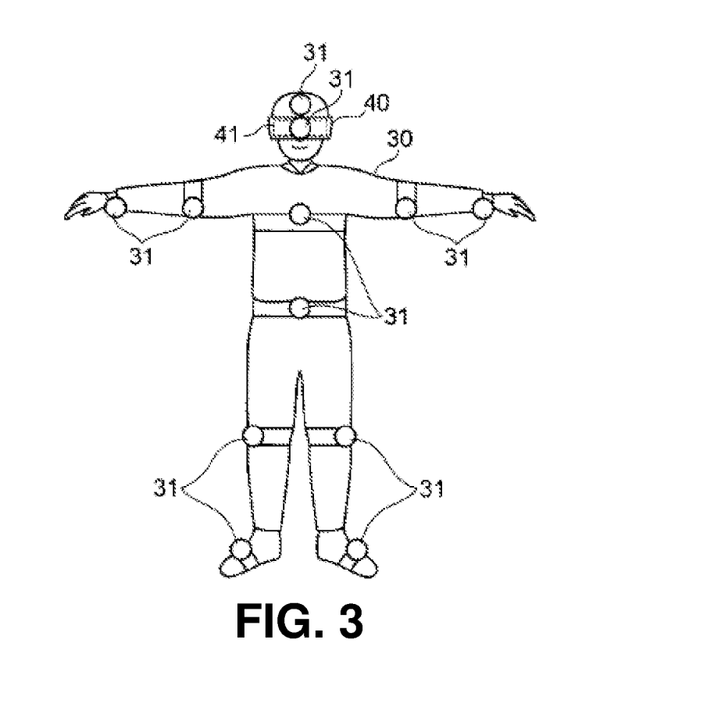
FIG. 3 is a view illustrating markers attached to the worker and a head mounted display device.

FIG. 3 is a view illustrating the markers attached to the worker and the head mounted display device. As illustrated in FIG. 3, markers 31 are attached to, in the worker 30, the head portion, elbow portions on both sides, hand portions on both sides, a chest portion, a waist portion, knee portions on both sides, and foot portions on both sides, and a marker 31 is attached to the head mounted display device 40. For the markers 31, known markers 31 such as spherical reflective markers are used.

Images of the worker 30 are captured by the plurality of cameras 22 fixed to the frame 21 in the real three-dimensional space 20, positions of the markers 31 attached to the worker 30 and the head mounted display device 40 are acquired based on the images captured by the plurality of cameras 22, and the position, posture, and line of sight of the worker 30 are acquired from the positions of the markers 31.

Once the position, posture, and line of sight of the worker 30 are acquired, a three-dimensional model of the worker is generated in the virtual three-dimensional space according to the position, posture, and line of sight of the worker 30, and the three-dimensional model of the worker is displayed on a display screen 41 of the head mounted display device 40 so as to be superimposed on a three-dimensional model of the vehicle as the work object which is virtually visually recognized by the worker 30 according to the position, posture, and line of sight of the worker 30.

Figure 4:
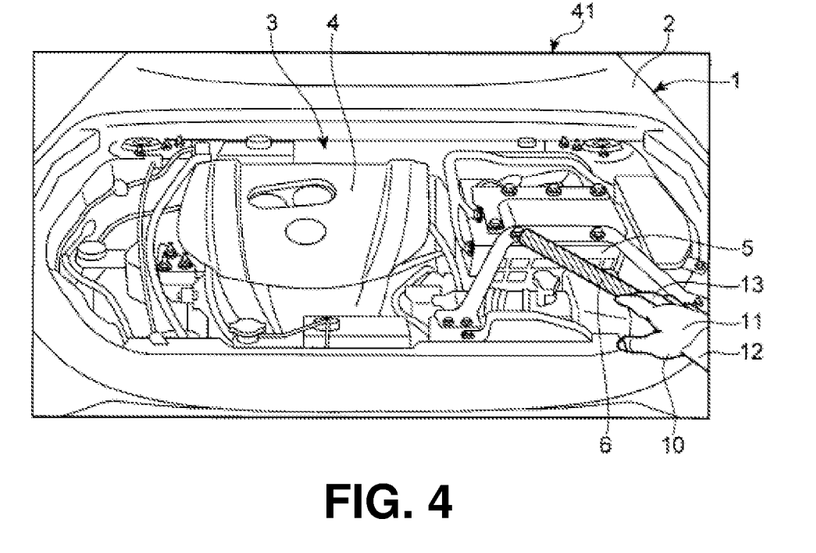
FIG. 4 is a view illustrating an example of a display screen of the head mounted display device.

FIG. 4 is a view illustrating an example of the display screen of the head mounted display device. As illustrated in FIG. 4, on the display screen 41 of the head mounted display device 40, a three-dimensional model of the vehicle 2 in the vehicle assembly line 1 as the work object in the production line is displayed, and a three-dimensional model of the worker 10 is displayed.

On the display screen 41 of the head mounted display device 40, the three-dimensional model of the worker 10 is displayed so as to move in line with a motion of the worker 30 in the real three-dimensional space 20, and the three-dimensional model of the worker 10 is displayed so as to be superimposed on the three-dimensional model of the vehicle 2 which is virtually visually recognized by the worker 30 according to the position, posture, and line of sight of the worker 30.

On the display screen 41 illustrated in FIG. 4, a front portion of the three-dimensional model of the vehicle 2 is displayed, and an engine 4, a battery 5, and the like which are disposed in an engine room 3 of the vehicle 2 are displayed. Furthermore, in FIG. 4, a right arm portion 12 including a right hand portion 11 of the three-dimensional model of the worker 10 is displayed.

Furthermore, on the display screen 41 of the head mounted display device 40, as indicated by diagonal hatching in FIG. 4, a distance visualization portion 6 is displayed in the three-dimensional model of the worker 10 which linearly extends from the right hand portion 11 as a predetermined section of the three-dimensional model of the worker 10 and connects the right hand portion 11 and the three-dimensional model of the vehicle 2 to visualize a distance between the right hand portion 11 and the vehicle 2.

The distance visualization portion 6 is displayed as a bar-shaped member extending in a linear, columnar, and bar shape from the right hand portion 11 of the three-dimensional model of the worker 10, specifically, a middle finger portion 13 of the right hand portion 11. The distance visualization portion 6 is formed with, for example, substantially the same diameter as the middle finger portion 13 of the right hand portion 11 of the three-dimensional model of the worker 10, and a length of one half the height of the three-dimensional model of the worker 10.

The distance visualization portion 6 is fixed to the right hand portion 11 of the three-dimensional model of the worker 10 and is moved together with the right hand portion 11 of the three-dimensional model of the worker 10 when the worker 30 moves his or her right hand portion in the real three-dimensional space 20. As illustrated in FIG. 4, in the case of interfering with the vehicle 2, the distance visualization portion 6 is displayed so as to extend from the right hand portion 11 of the three-dimensional model of the worker 10 to the three-dimensional model of the vehicle 2, and the right hand portion 11 and the three-dimensional model of the vehicle 2 are connected by the distance visualization portion 6, so that the distance between the right hand portion 11 and the vehicle 2 is visualized by the length of the distance visualization portion 6.

In the case of interfering with the vehicle 2, the distance visualization portion 6 may have a shortened length and may be displayed so as to extend from the right hand portion 11 of the three-dimensional model of the worker 10 to the three-dimensional model of the vehicle 2. Alternatively, the three-dimensional model of the vehicle 2 may be displayed in front of a section of the distance visualization portion 6 interfering with the vehicle 2, and the distance visualization portion 6 may be displayed so as to extend from the right hand portion 11 of the three-dimensional model of the worker 10 to the three-dimensional model of the vehicle 2.

Figure 5:
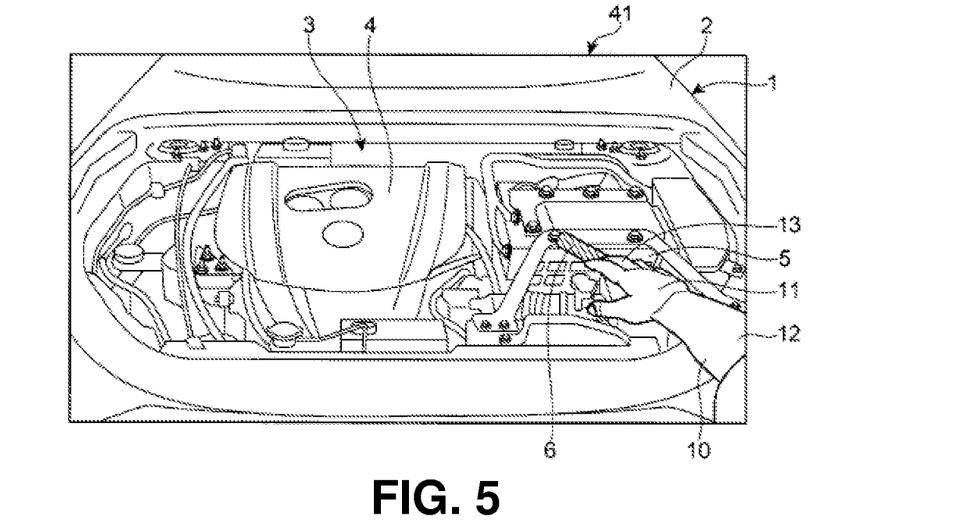
FIG. 5 is a view illustrating another example of the display screen of the head mounted display device.

FIG. 5 is a view illustrating another example of the display screen of the head mounted display device. From the state displayed on the display screen 41 illustrated in FIG. 4, when the worker 30 moves forward his or her right hand portion such that the right hand portion 11 of the worker 10 is moved to the three-dimensional model side of the vehicle 2 in the virtual three-dimensional space, as illustrated in FIG. 5, on the display screen 41 of the head mounted display device 40, the right hand portion 11 of the three-dimensional model of the worker 10 is displayed so as to move to the three-dimensional model side of the vehicle 2.

When the right hand portion 11 of the three-dimensional model of the worker 10 is displayed so as to move, the distance visualization portion 6 is also displayed so as to move in association with the movement of the right hand portion 11. In the case of interfering with the vehicle 2, the distance visualization portion 6 is displayed so as to extend from the right hand portion 11 of the three-dimensional model of the worker 10 to the three-dimensional model of the vehicle 2. The distance visualization portion 6 is displayed with a length according to the distance between the right hand portion 11 and the vehicle 2, which is, in the state illustrated in FIG. 5, displayed so as to be shorter than in the state illustrated in FIG. 4.

Thus, in the video processing apparatus according to the present embodiment, the three-dimensional model of the worker 10 is displayed on the display screen 41 of the head mounted display device 40 so as to be superimposed on the three-dimensional model of the work object 2 which is virtually visually recognized by the worker 30 according to the position, posture, and line of sight of the worker 30, and the distance visualization portion 6 linearly extending from the predetermined section 11 of the three-dimensional model of the worker 10 is displayed on the three-dimensional model of the worker 10.

Figure 6:
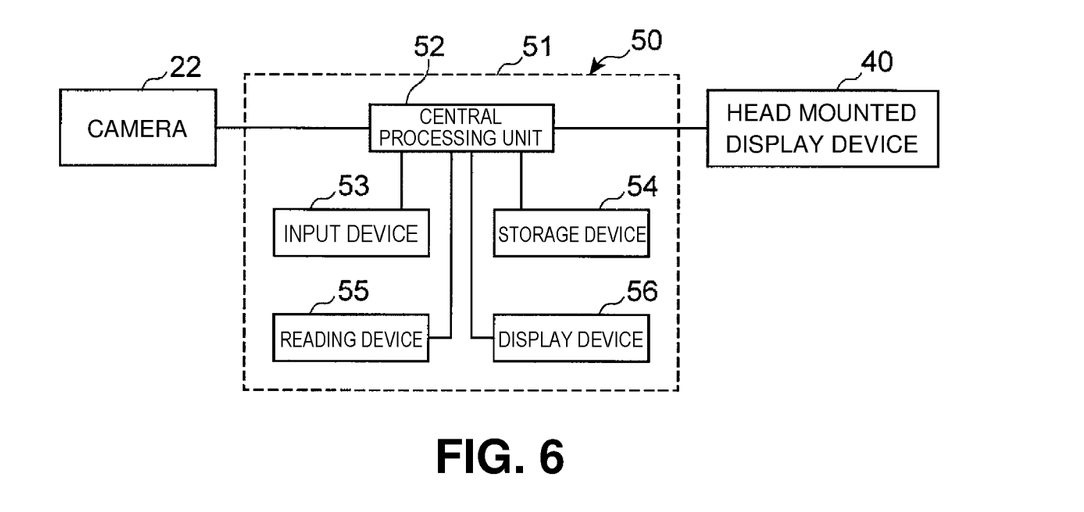
FIG. 6 is a view illustrating a configuration of the video processing apparatus.

FIG. 6 is a view illustrating a configuration of the video processing apparatus. As illustrated in FIG. 6, a video processing apparatus 50 according to the first embodiment of the present disclosure includes the plurality of cameras 22 that capture images of the real three-dimensional space 20, the head mounted display device 40 to be mounted on the worker 30, and a computer 51 that processes a video to be displayed on the display screen 41 of the head mounted display device 40 or the like based on signals input from the cameras 22 or the like.

The computer 51 has a central processing unit 52 as a processor capable of executing a computer program, an input device 53 such as a keyboard for inputting data and the like, and a storage device 54 such as a memory for recording a program and data, and also has a reading device 55 that reads a recording medium such as a DVD, and a display device 56 such as a stationary display device.

The central processing unit 52 is configured to be capable of accessing the input device 53, the storage device 54, the reading device 55, and the like, and is configured to simulate work of the worker using information input from the cameras 22 and the program and data stored in the storage device 54. The central processing unit 52 is also configured to display the video on the display screen of the head mounted display device 40 or a display screen of a display device such as a stationary display device.

Figure 7:
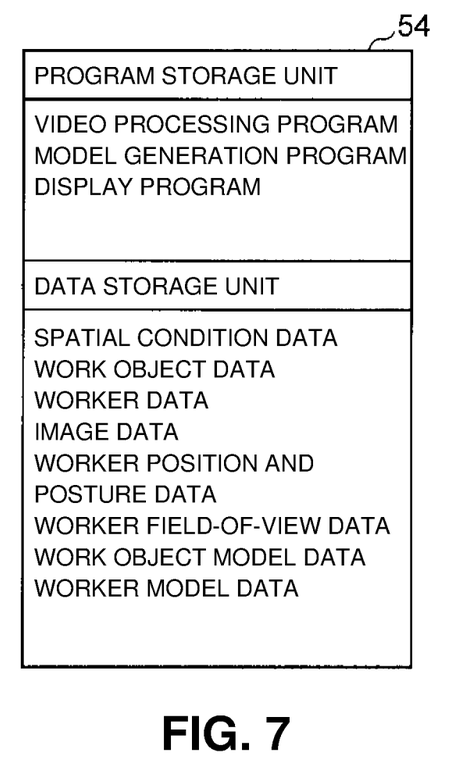
FIG. 7 is a view illustrating a configuration of a storage device of the video processing apparatus illustrated in FIG. 6.

FIG. 7 is a view illustrating a configuration of the storage device of the video processing apparatus illustrated in FIG. 6. As illustrated in FIG. 7, the storage device 54 has a program storage unit and a data storage unit. The program storage unit stores, for example, a video processing program for processing the video to be displayed on the display screen of the head mounted display device 40 or the like, a model generation program for generating the three-dimensional model of the work object, the worker, or the like, and a display program for displaying the three-dimensional model or the like of the work object, the worker, or the like.

The data storage unit stores, for example, in files thereof, spatial condition data such as the origin position and the XYZ coordinate system in the real three-dimensional space 20 and the origin position and the XYZ coordinate system in the virtual three-dimensional space, work object data serving as three-dimensional data of the work object, worker data serving as three-dimensional data of the worker, image data captured by the cameras 22, worker position and posture data serving as a position and posture of the worker, worker field-of-view data serving as a field of view of the worker, work object model data of the three-dimensional model of the work object in the virtual three-dimensional space, and worker model data of the three-dimensional model of the worker in the virtual three-dimensional space.

Figure 8:
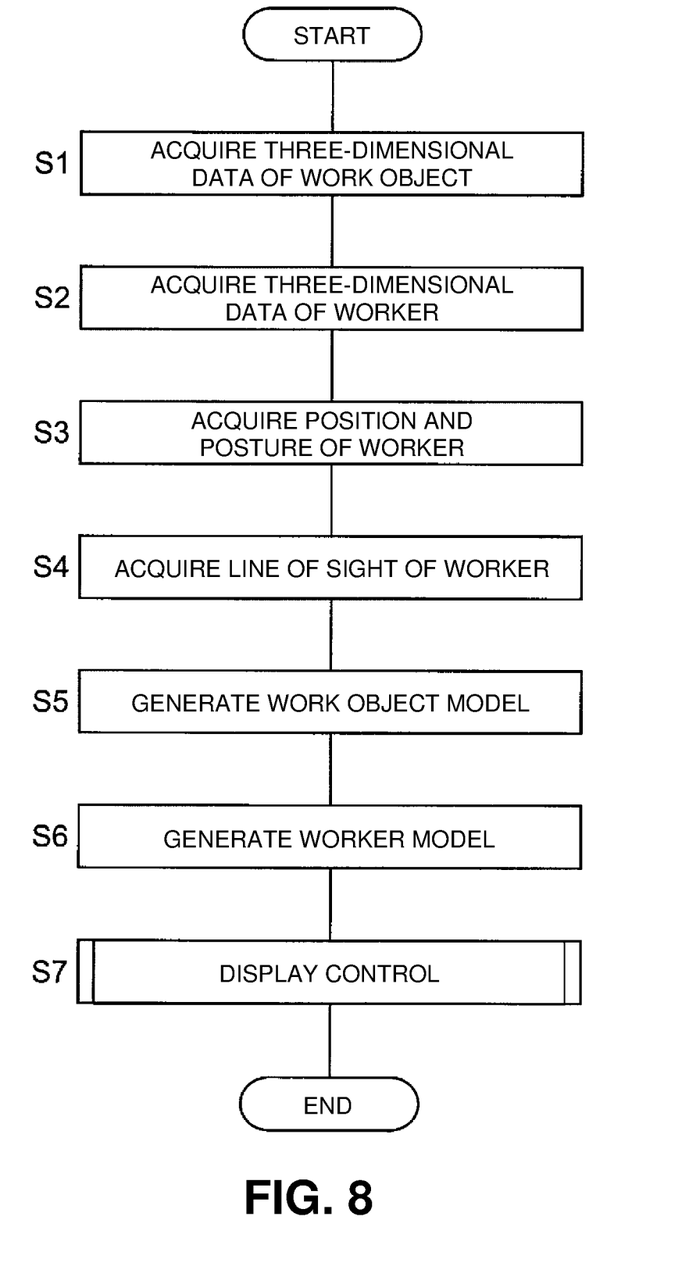
FIG. 8 is a flowchart illustrating operations of the video processing apparatus.

FIG. 8 is a flowchart illustrating operations of the video processing apparatus. FIG. 8 illustrates operations of the video processing program of the video processing apparatus 50. In the video processing apparatus 50, the origin position P1 and the XYZ coordinate system in the real three-dimensional space 20 are first acquired by using the origin setting implement 23, the origin position and the XYZ coordinate system in the virtual three-dimensional space are aligned with the origin position P1 and the XYZ coordinate system in the real three-dimensional space 20, and the origin position P1 and the XYZ coordinate system in the real three-dimensional space 20 and the origin position and the XYZ coordinate system in the virtual three-dimensional space are stored in the data storage unit of the storage device 54 as the spatial condition data.

Furthermore, in the video processing apparatus 50, the three-dimensional data of the work object having the three-dimensional shape of the work object on which the worker 30 performs virtual work and the three-dimensional data of the worker having the three-dimensional shape of the worker are input via the input device 53, the reading device 55, and the like and stored in the data storage unit.

Once the spatial condition data, the three-dimensional data of the work object, and the three-dimensional data of the worker are stored, in the video processing apparatus 50, as illustrated in FIG. 8, the three-dimensional data of the work object stored in the data storage unit is acquired (step S1), and the three-dimensional data of the worker stored in the data storage unit is acquired (step S2).

Next, images of the worker 30 performing virtual work in the real three-dimensional space 20 which have been captured by the plurality of cameras 22 are acquired and stored in the data storage unit, the position and posture of the worker 30 in the real three-dimensional space 20 are acquired based on the images captured by the plurality of cameras 22, (step S3), and the line of sight of the worker 30 in the real three-dimensional space 20 is acquired (step S4). The position, posture, and line of sight of the worker 30 are acquired from the positions of the markers 31 attached to the worker 30 and the head mounted display device 40, and the acquired data of the position, posture, and line of sight of the worker 30 is stored in the data storage unit.

Then, by the model generation program, the three-dimensional model having the three-dimensional shape of the work object 2 in the virtual three-dimensional space is generated based on the spatial condition data and the three-dimensional data of the work object (step S5), and the three-dimensional model having the three-dimensional shape of the worker 10 in the virtual three-dimensional space is generated based on the spatial condition data, the three-dimensional data of the worker, and the position and posture of the worker 30 in the real three-dimensional space 20 (step S6). As illustrated in FIG. 4, the three-dimensional model of the work object 2 and the three-dimensional model of the worker 10 are generated in the virtual three-dimensional space, and the generated three-dimensional model data of the work object 2 and the generated three-dimensional model data of the worker 10 are stored in the data storage unit.

Once the three-dimensional model of the work object 2 and the three-dimensional model of the worker 10 in the virtual three-dimensional space are generated, display control is performed in which, on the display screen 41 of the head mounted display device 40 mounted on the worker 30, the three-dimensional model of the work object 2 is displayed, and the three-dimensional model of the worker 10 is displayed so as to be superimposed on the three-dimensional model of the work object 2 which is virtually visually recognized by the worker 30 according to the position, posture, and line of sight of the worker 30 (step S7).

Figure 9:
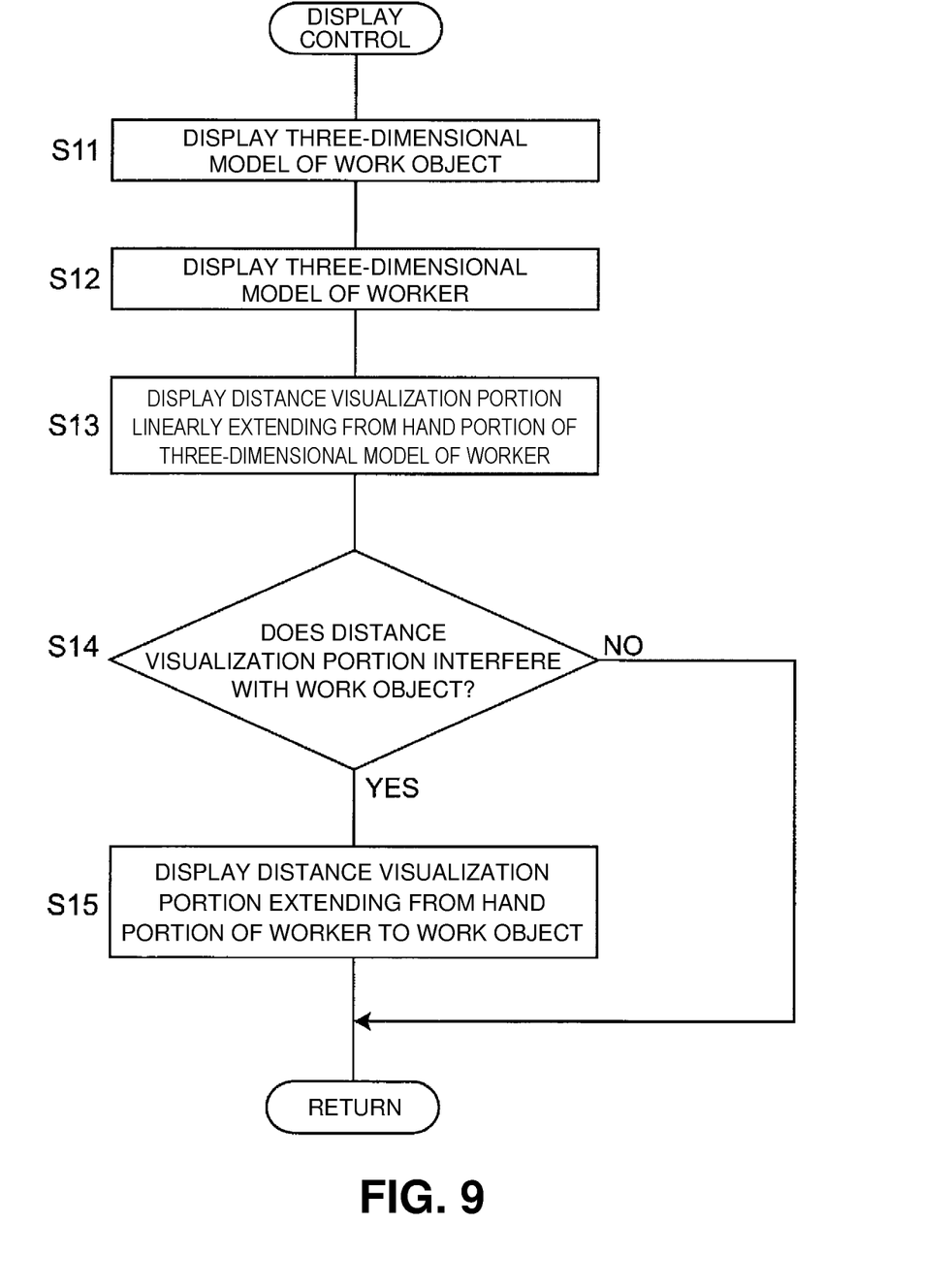
FIG. 9 is a flowchart illustrating display control of the video processing apparatus.

FIG. 9 is a flowchart illustrating the display control of the video processing apparatus. FIG. 9 illustrates operations of the display program in the video processing apparatus 50. As illustrated in FIG. 9, by using the display program, on the display screen 41 of the head mounted display device 40, the three-dimensional model of the work object 2 is displayed (step S11), and the three-dimensional model of the worker 10 is displayed (step S12).

The three-dimensional model of the work object 2 and the three-dimensional model of the worker 10 are displayed such that the three-dimensional model of the work object 2 and the three-dimensional model of the worker 10 which have been generated by steps S5 and S6 are virtually visually recognized by the worker 30 according to the position, posture, and line of sight of the worker 30. As illustrated in FIGS. 4 and 5, the three-dimensional model of the work object 2 and the three-dimensional model of the worker 10 which are virtually visually recognized by the worker 30 are displayed.

Next, the distance visualization portion 6 linearly extending from the hand portion 11 of the three-dimensional model of the worker 10 is displayed on the display screen 41 of the head mounted display device 40 in a predetermined display color such as blue (step S13). The distance visualization portion 6 is displayed so as to be virtually visually recognized by the worker 30 as a three-dimensional model of a bar-shaped member extending in a columnar and bar shape with a predetermined length set in advance, and is displayed so as to move together with the hand portion 11 of the three-dimensional model of the worker 10.

Then, it is determined whether the distance visualization portion 6 interferes with the work object 2 (step S14). It is determined whether the distance visualization portion 6 extending from the hand portion 11 of the three-dimensional model of the worker 10 interferes with the three-dimensional model of the work object 2 in the virtual three-dimensional space.

When the determination result in step S14 is YES, it is determined that the distance visualization portion 6 interferes with the work object 2, and the distance visualization portion 6 linearly extending from the hand portion 11 of the three-dimensional model of the worker 10 to the three-dimensional model of the work object 2 is displayed (step S15). The distance visualization portion 6 is displayed so as to connect the hand portion 11 of the three-dimensional model of the worker 10 and the three-dimensional model of the vehicle 2.

On the other hand, when the determination result in step S14 is NO, it is determined that the distance visualization portion 6 does not interfere with the work object 2, and the distance visualization portion 6 linearly extending from the hand portion 11 of the three-dimensional model of the worker 10 with the predetermined length set in advance is displayed.

Thus, in the video processing apparatus 50, the three-dimensional model of the worker 10 is displayed on the display screen 41 of the head mounted display device 40 so as to be superimposed on the three-dimensional model of the work object 2 which is virtually visually recognized by the worker 30 according to the position, posture, and line of sight of the worker 30, and the distance visualization portion 6 linearly extending from the predetermined section 11 of the three-dimensional model of the worker 10 is displayed on the three-dimensional model of the worker 10.

The distance visualization portion 6 is moved in association with movement of the predetermined section 11 of the three-dimensional model of the worker 10, and in the case of interfering with the three-dimensional model of the work object 2, the distance visualization portion 6 is displayed so as to extend from the predetermined section 11 of the three-dimensional model of the worker 10 to the three-dimensional model of the work object 2.

Furthermore, in the video processing apparatus 50, using the display program, the whole three-dimensional model of the work object 2 and the whole three-dimensional model of the worker 10 in the virtual three-dimensional space are displayed on a display screen of a stationary display device as the display device 56. Thus, it is possible to evaluate the work of the worker 30 by simulating the work of the worker in the production line from the three-dimensional model of the worker 10 displayed on the display screen of the stationary display device.

Although in the present embodiment, the distance visualization portion 6 extending from the right hand portion 11 of the three-dimensional model of the worker 10 is displayed on the display screen 41 of the head mounted display device 40, a distance visualization portion linearly extending from a left hand portion of the three-dimensional model of the worker 10 may be displayed.

Furthermore, although the position, posture, and line of sight of the worker 30 are acquired by using an optical motion capture device that captures, using the cameras 22, images of the markers 31 attached to the worker 30 and the head mounted display device 40, the position, posture, and line of sight of the worker may be acquired by using a mechanical or magnetic motion capture device.

Furthermore, although the worker 30 performs virtual work in a state in which the vehicle 2 as the work object stands still, the present embodiment can also be applied to a case where the worker 30 performs virtual work while the vehicle 2 is moving. Furthermore, although the worker 30 performs virtual work with respect to the vehicle 2, the present embodiment can also be applied to other work.

Thus, in the present embodiment, in the processing of the video to be displayed on the display screen 41 of the head mounted display device 40 mounted on the worker 30, the position, posture, and line of sight of the worker 30 are acquired, and the three-dimensional model of the worker 10 is displayed on the display screen 41 so as to be superimposed on the three-dimensional model of the work object 2 which is virtually visually recognized by the worker 30 according to the position, posture, and line of sight of the worker 30. Then, the distance visualization portion 6 linearly extending from the predetermined section 11 of the three-dimensional model of the worker 10 and connecting the predetermined section 11 and the three-dimensional model of the work object 2 is displayed on the three-dimensional model of the worker 10.

Thus, the distance visualization portion 6 linearly extending from the predetermined section 11 of the three-dimensional model of the worker 10 can be displayed so as to be shorter as the distance between the predetermined section 11 of the worker 10 and the work object 2 becomes shorter, and can be displayed with a length according to the distance between the predetermined section 11 of the worker 10 and the work object 2. Accordingly, in the processing of the video to be displayed on the display screen 41 of the head mounted display device 40 mounted on the worker 30, it is possible to allow the worker 30 to intuitively recognize the distance between the predetermined section 11 of the worker 10 and the work object 2 which are displayed on the display screen 41, by the length of the distance visualization portion 6.

Since it is possible to allow the worker 30 to intuitively recognize the distance between the predetermined section 11 of the worker 10 and the work object 2, for example, when work of the worker 30 in a production line such as a vehicle assembly line is simulated to evaluate the work load on the worker 30, it is possible to simulate the same work as in the case where the worker 30 performs work with respect to the actual work object 2, and it is possible to evaluate the work load on the worker 30 with high accuracy.

Furthermore, the distance visualization portion 6 linearly extending from the hand portion 11 of the three-dimensional model of the worker 10 is displayed. Thus, in the case of simulating manual work of the worker 30 with respect to the work object 2, it is possible to allow the worker 30 to intuitively recognize the distance between the hand portion 11 of the worker 10 and the work object 2 which are displayed on the display screen 41.

Furthermore, the distance visualization portion 6 extending in a linear and bar shape is displayed. Thus, by using the distance visualization portion 6 extending in the linear and bar shape from the predetermined section 11 of the three-dimensional model of the worker 10, it is possible to allow the worker 30 to intuitively recognize the distance between the predetermined section 11 of the worker 10 and the work object 2 with relative ease.

Figure 10:
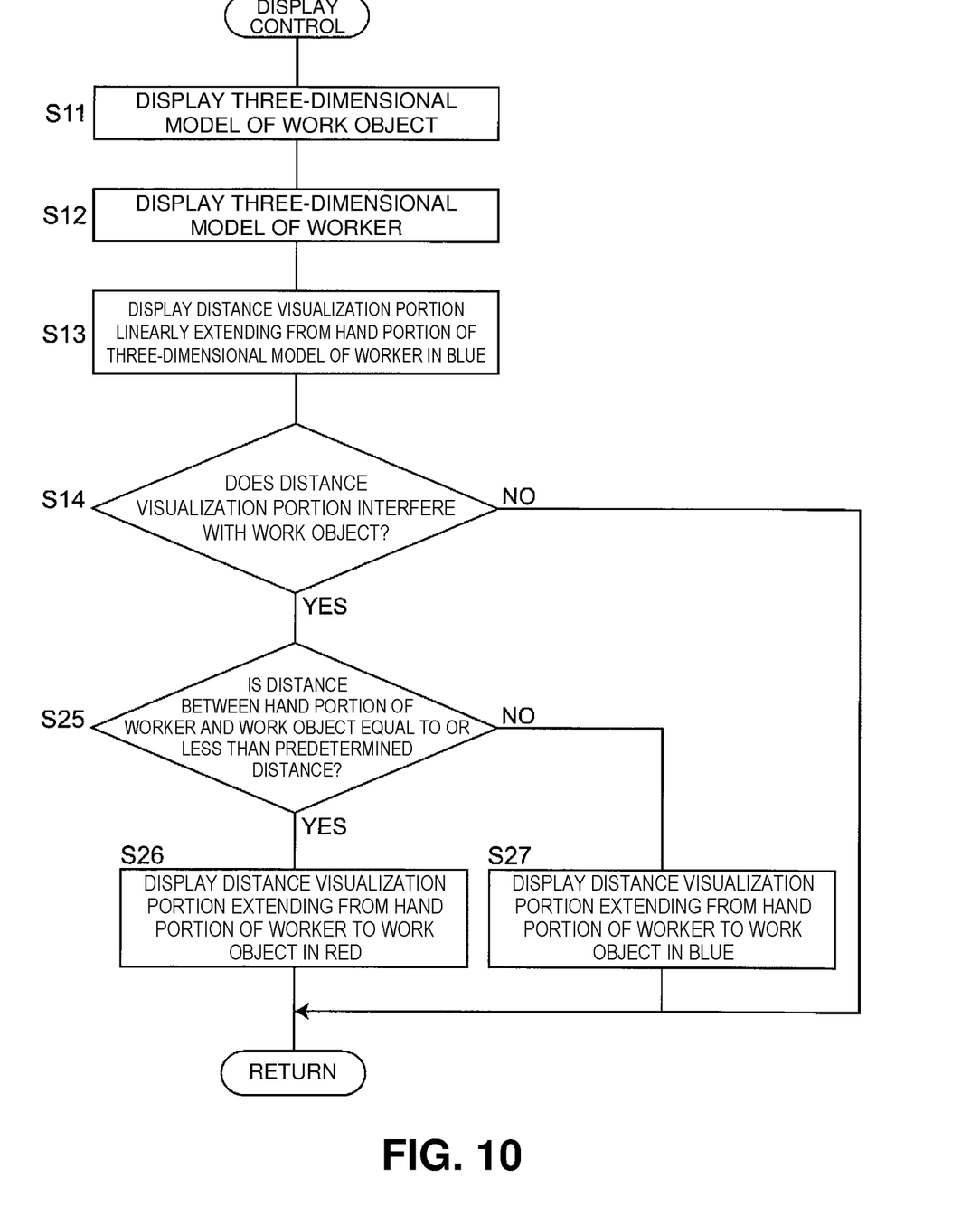
FIG. 10 is a flowchart illustrating display control of a video processing apparatus according to a second embodiment.

FIG. 10 is a flowchart illustrating display control of a video processing apparatus according to a second embodiment. The video processing apparatus according to the second embodiment is the same as the video processing apparatus according to the first embodiment except for the display control, and thus only differences from the video processing apparatus according to the first embodiment will be described.

As illustrated in FIG. 10, also in the video processing apparatus according to the second embodiment, by using a display control program, on the display screen 41 of the head mounted display device 40, the three-dimensional model of the work object 2 is displayed (step S11), the three-dimensional model of the worker 10 is displayed (step S12), and the distance visualization portion 6 linearly extending from the hand portion 11 of the three-dimensional model of the worker 10 is displayed in a blue display color (step S13). The distance visualization portion 6 is displayed as a three-dimensional model of a bar-shaped member extending in a columnar and bar shape with a predetermined length set in advance, and is displayed so as to move together with the hand portion 11 of the three-dimensional model of the worker 10.

Then, it is determined whether the distance visualization portion 6 interferes with the work object 2 (step S14). It is determined whether the distance visualization portion 6 extending from the hand portion 11 of the three-dimensional model of the worker 10 interferes with the three-dimensional model of the work object 2 in the virtual three-dimensional space.

When the determination result in step S14 is YES, it is determined whether the distance between the hand portion 11 of the three-dimensional model of the worker 10 and the work object 2 is equal to or less than a predetermined distance, for example, equal to or less than 5 cm (step S25). It is determined whether the length of the distance visualization portion 6 linearly extending from the hand portion 11 of the three-dimensional model of the worker 10 to the work object 2 is equal to or less than a predetermined distance shorter than a predetermined length set in advance.

When the determination result in step S25 is YES, the distance visualization portion 6 linearly extending from the hand portion 11 of the three-dimensional model of the worker 10 to the work object 2 is displayed in red which is a display color different from blue (step S26), and when the determination result in step S25 is NO, the distance visualization portion 6 linearly extending from the hand portion 11 of the three-dimensional model of the worker 10 to the work object 2 is displayed in blue (step S27).

On the other hand, when the determination result in step S14 is NO, it is determined that the distance visualization portion 6 does not interfere with the work object 2, and the distance visualization portion 6 linearly extending from the hand portion 11 of the three-dimensional model of the worker 10 with the predetermined length set in advance is displayed in blue.

Thus, also in the video processing apparatus according to the present embodiment, the three-dimensional model of the worker 10 is displayed on the display screen 41 of the head mounted display device 40 so as to be superimposed on the three-dimensional model of the work object 2 which is virtually visually recognized by the worker 30 according to the position, posture, and line of sight of the worker 30, and the distance visualization portion 6 linearly extending from the predetermined section 11 of the three-dimensional model of the worker 10 is displayed on the three-dimensional model of the worker 10.

The distance visualization portion 6 is moved in association with movement of the predetermined section 11 of the three-dimensional model of the worker 10, and in the case of interfering with the three-dimensional model of the work object 2, the distance visualization portion 6 is displayed so as to extend from the predetermined section 11 of the three-dimensional model of the worker 10 to the three-dimensional model of the work object 2.

In the present embodiment, the display mode of the distance visualization portion 6 is changed by changing the display color of the distance visualization portion 6 according to the distance between the predetermined section 11 and the work object 2 such that the distance visualization portion 6 linearly extending from the predetermined section 11 of the three-dimensional model of the worker 10 is displayed in blue, and the distance visualization portion 6 is displayed in red when the distance between the predetermined section 11 and the work object 2 is equal to or less than the predetermined distance.

Thus, also in the present embodiment, in the processing of the video to be displayed on the display screen 41 of the head mounted display device 40 mounted on the worker 30, the distance visualization portion 6 linearly extending from the predetermined section 11 of the three-dimensional model of the worker 10 and connecting the predetermined section 11 and the three-dimensional model of the work object 2 is displayed on the three-dimensional model of the worker 10.

Thus, in the processing of the video to be displayed on the display screen 41 of the head mounted display device 40 mounted on the worker 30, it is possible to allow the worker 30 to intuitively recognize the distance between the predetermined section 11 of the worker 10 and the work object 2 which are displayed on the display screen 41, by the length of the distance visualization portion 6.

Furthermore, the display mode of the distance visualization portion 6 is changed according to the distance between the predetermined section 11 of the worker 10 and the work object 2. Thus, it is also possible to allow the worker 30 to recognize the distance between the predetermined section 11 of the worker 10 and the work object 2 by the display mode of the distance visualization portion 6 without changing the display region of the distance visualization portion 6.

Furthermore, the display mode of the distance visualization portion 6 is changed by changing the display color of the distance visualization portion 6 according to the distance between the predetermined section 11 of the worker 10 and the work object 2. Thus, it is possible to change the display mode of the distance visualization portion 6 with relative ease.

Figure 11:
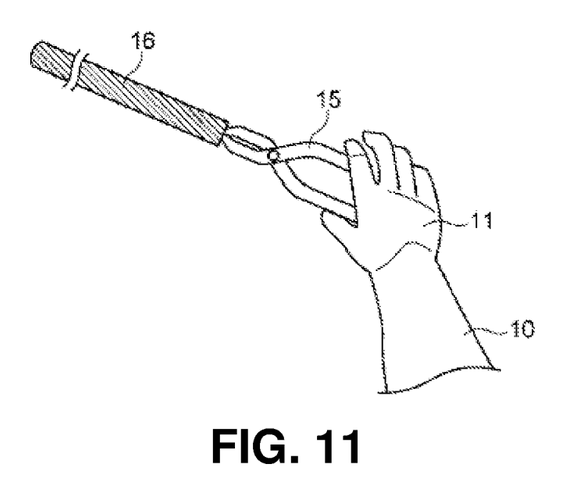
FIG. 11 is an explanatory view for describing a modification of the display control of the video processing apparatus.

FIG. 11 is an explanatory view for describing a modification of the display control of the video processing apparatus. In the video processing apparatus 50 according to the above-described embodiment, on the display screen 41 of the head mounted display device 40, when the distance visualization portion 6 linearly extending from the hand portion 11 as the predetermined section of the three-dimensional model of the worker 10 is displayed on the three-dimensional model of the worker 10, a distance visualization portion 16 may be displayed which linearly extends from a holding member 15 such as pliers provided at the hand portion 11 of the three-dimensional model of the worker 10, as illustrated in FIG. 11.

Also in such a case, when the hand portion 11 of the three-dimensional model of the worker 10 is moved, the distance visualization portion 16 is displayed so as to move together with the holding member 15 fixed to the hand portion 11. Furthermore, in the case of interfering with the vehicle 2 as the work object, the distance visualization portion 16 is displayed so as to extend from the holding member 15 provided at the hand portion 11 of the three-dimensional model of the worker 10 to the three-dimensional model of the vehicle 2.

Thus, the distance visualization portion 16 linearly extending from the holding member 15 provided at the predetermined section 11 of the three-dimensional model of the worker 10 is displayed on the three-dimensional model of the worker 10, so that, in the processing of the video to be displayed on the display screen 41 of the head mounted display device 40 mounted on the worker 30, it is possible to allow the worker 30 to intuitively recognize the distance between the holding member 15 provided at the predetermined section 11 of the worker 10 and the work object which are displayed on the display screen 41, by the length of the distance visualization portion 16.

Although in the above-described embodiment, in the computer 51, the video processing program recorded in the storage device 54 is used to process the video to be displayed on the display screen 41 of the head mounted display device 40, for example, a video processing program recorded in an optical disc medium such as a DVD or a recording medium such as a magnetic tape medium may be used so that the video to be displayed on the display screen 41 of the head mounted display device 40 is processed by reading the video processing program via the reading device 55.

The present disclosure is not limited to the exemplified embodiments, and various improvements and design changes are possible without departing from the gist of the present disclosure.

As described above, according to the present disclosure, it is possible to allow a worker to intuitively recognize a distance between a predetermined section of the worker and a work object which are displayed on a display screen of a head mounted display device mounted on the worker; accordingly, it may be preferably used in the case where, by means of mixed reality, a video is processed so that a three-dimensional model of the work object and a three-dimensional model of the worker are displayed on the display screen of the head mounted display device according to a posture and line of sight of the worker.

What is claimed is:

1. A video processing method for processing a video to be displayed on a display screen of a head mounted display device mounted on a head portion of a worker, the video processing method comprising:
   a step (a) of acquiring a position and posture of the worker;
   a step (b) of acquiring a line of sight of the worker; and
   a step (c) of displaying on the display screen a three-dimensional model of a work object on which the worker performs virtual work and a three-dimensional model of the worker according to the position and posture of the worker acquired by the step (a) and the line of sight of the worker acquired by the step (b), wherein in the step (c), a distance visualization portion is displayed on the display screen, the distance visualization portion linearly extending from a predetermined section of the three-dimensional model of the worker and connecting the predetermined section and the three-dimensional model of the work object to visualize a distance between the predetermined section and the work object, wherein in the step (c), a display mode of the distance visualization portion is changed according to the distance between the predetermined section and the work object.

2. The video processing method according to claim 1, wherein in the step (c), the display mode of the distance visualization portion is for changing a display color.

3. The video processing method according to claim 1, wherein the virtual work is manual work in an assembly work or a fastening work.

4. The video processing method according to claim 1, wherein the predetermined section is a hand portion of the three-dimensional model of the worker or a holding member provided in the hand portion of the three-dimensional model of the worker.

5. The video processing method according to claim 1, wherein the distance visualization portion is displayed so as to be fixed to and moved together with a hand portion of the three-dimensional model of the worker or a holding member provided on the hand portion in accordance with a movement of the hand portion or the holding member.

6. The video processing method according to claim 1, wherein in the step (c), the predetermined section and the three-dimensional model of the work object are displayed on the same display screen, and the predetermined section is a hand portion of the three-dimensional model of the worker or a holding member provided in the hand portion of the three-dimensional model of the worker.

7. A video processing apparatus for processing a video to be displayed on a display screen of a head mounted display device mounted on a head portion of a worker, the video processing apparatus comprising:

a processor; and a memory that stores a computer program executable by the processor, the computer program, when executed by the processor, executing:

a step (a) of acquiring a position and posture of the worker;

a step (b) of acquiring a line of sight of the worker; and a step (c) of displaying on the display screen a three-dimensional model of a work object on which the worker performs virtual work and a three-dimensional model of the worker according to the position and posture of the worker acquired by the step (a) and the line of sight of the worker acquired by the step (b), wherein in the step (c), a distance visualization portion is displayed on the display screen, the distance visualization portion linearly extending from a predetermined section of the three-dimensional model of the worker and connecting the predetermined section and the three-dimensional model of the work object to visualize a distance between the predetermined section and the work object, wherein the distance visualization portion extends in a linear and bar shape.

8. The video processing apparatus according to claim 7, wherein the virtual work is manual work in an assembly work or a fastening work.

9. The video processing apparatus according to claim 7, wherein the predetermined section is a hand portion of the three-dimensional model of the worker or a holding member provided in the hand portion of the three-dimensional model of the worker.

10. The video processing apparatus according to claim 7, wherein the distance visualization portion is displayed so as to be fixed to and moved together with a hand portion of the three-dimensional model of the worker or a holding member provided on the hand portion in accordance with a movement of the hand portion or the holding member.

11. The video processing apparatus according to claim 7, wherein in the step (c), the predetermined section and the three-dimensional model of the work object are displayed on the same display screen, and the predetermined section is a hand portion of the three-dimensional model of the worker or a holding member provided in the hand portion of the three-dimensional model of the worker.

12. A video processing apparatus for processing a video to be displayed on a display screen of a head mounted display device mounted on a head portion of a worker, the video processing apparatus comprising:

a processor; and a memory that stores a computer program executable by the processor, the computer program, when executed by the processor, executing:

a step (a) of acquiring a position and posture of the worker;

a step (b) of acquiring a line of sight of the worker; and a step (c) of displaying on the display screen a three-dimensional model of a work object on which the worker performs virtual work and a three-dimensional model of the worker according to the position and posture of the worker acquired by the step (a) and the line of sight of the worker acquired by the step (b), wherein in the step (c), a distance visualization portion is displayed on the display screen, the distance visualization portion linearly extending from a predetermined section of the three-dimensional model of the worker and connecting the predetermined section and the three-dimensional model of the work object to visualize a distance between the predetermined section and the work object, wherein in the step (c), a display mode of the distance visualization portion is changed according to the distance between the predetermined section and the work object.

13. The video processing apparatus according to claim 12, wherein in the step (c), the display mode of the distance visualization portion is for changing a display color.

14. The video processing apparatus according to claim 12, wherein the virtual work is manual work in an assembly work or a fastening work.

15. The video processing apparatus according to claim 12, wherein the predetermined section is a hand portion of the three-dimensional model of the worker or a holding member provided in the hand portion of the three-dimensional model of the worker.

16. The video processing apparatus according to claim 12, wherein the distance visualization portion is displayed so as to be fixed to and moved together with a hand portion of the three-dimensional model of the worker or a holding member provided on the hand portion in accordance with a movement of the hand portion or the holding member.

17. The video processing apparatus according to claim 12, wherein
- in the step (c), the predetermined section and the three-dimensional model of the work object are displayed on the same display screen, and
- the predetermined section is a hand portion of the three-dimensional model of the worker or a holding member provided in the hand portion of the three-dimensional model of the worker.

* * * * *